June 7, 1955  R. STEWART ET AL  2,710,026
MOLDED TAPERED TUBES AND METHOD OF MAKING SAME
Filed July 19, 1950
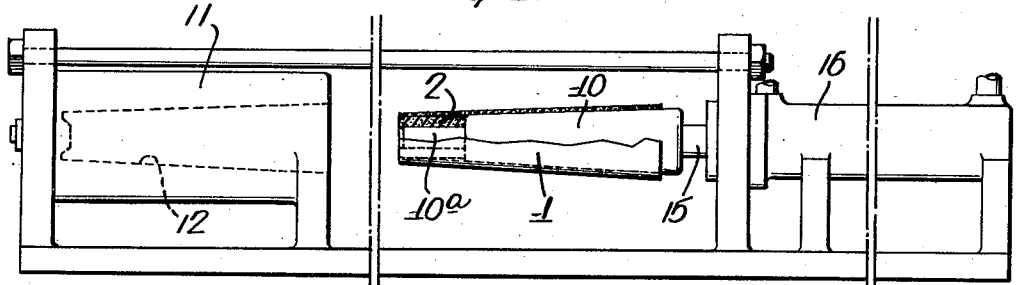
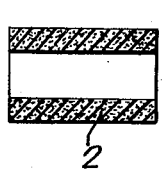
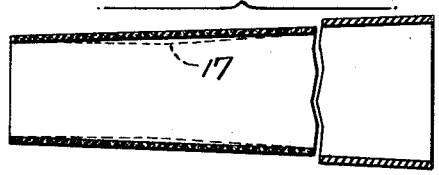
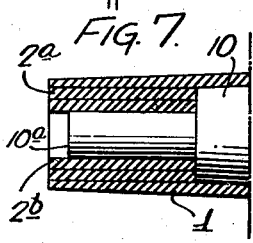
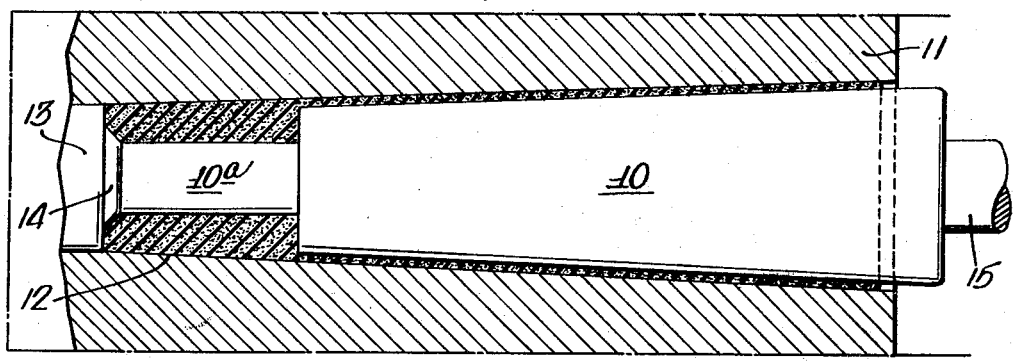
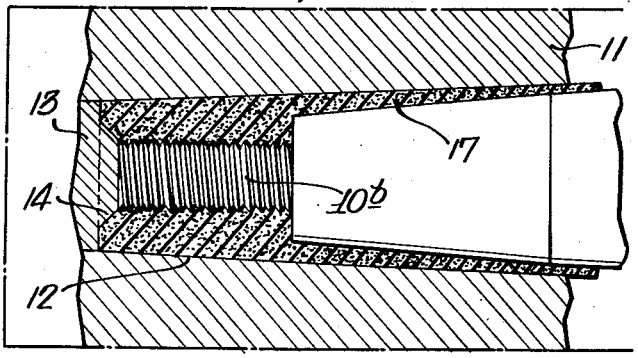
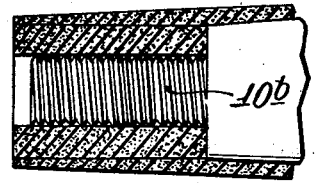
Inventors:
Robert Stewart
Alfred Ploger
by their Attorneys
Howson & Howson United States Patent Office 2,710,026
Patented June 7, 1955

2,710,026

MOLDED TAPERED TUBES AND METHOD OF MAKING SAME

Robert Stewart and Alfred Ploger, Newark, Del., assignors to Continental-Diamond Fibre Company, Newark, Del., a corporation of Delaware Application July 19, 1950, Serial No. 174,706

6 Claims. (Cl. 138—78)

This invention relates to improvements in molded longitudinally tapered tubes of the type described in United States Patent No. 2,400,031 issued May 7, 1946.

More particularly the invention relates to molded longitudinally tapered tubes of the type described having an internal bushing of similar non-metallic material impregnated with and bonded to the tube by a moldable material, such as moldable resinous material.

Examples of the use of such molded tubes are to be found in the horns utilized in carbon dioxide fire-extinguishing apparatus and in other apparatus where the distribution of a liquid or gas is required. In these and other similar uses it is necessary to provide in the horn a suitable bushing for the attachment thereto of a valve, nozzle or like device. Prior to the present invention, it has been the practice to incorporate in such horns a metallic bushing which is mechanically secured or anchored in the end of the tube during the molding and curing operation. However, the use of separate metal bushings is objectionable since they tend to become loose after relatively short periods of use. Furthermore the use of separate metal bushings is substantially more expensive as respects both materials and manufacturing costs than a non-metallic bushing molded directly into the tube, but prior to the present invention no satisfactory method has been devised for producing a horn having a non-metallic bushing integrally bonded therein.

With the foregoing in mind the principal object of the present invention is to provide a molded longitudinally tapered tube or horn of sheet material impregnated with a moldable material and having integrally molded and bonded thereto an internal bushing of non-metallic material impregnated with a compatible moldable material.

Another object of the invention is to provide a novel method for producing molded horns of the type described having bushings of non-metallic material bonded thereto by a moldable material as set forth.

These and other objects of the invention and the various features and details of the constructions and manufacture thereof are hereinafter fully set forth and described with reference to the accompaying drawing in which:

Fig. 1 is a side elevation partially in section of a molding apparatus for producing molded tapered tubes having non-metallic internal bushings in accordance with the present invention;

Fig. 2 is a longitudinal sectional view of a tubular non-metallic bushing "preform" made in accordance with the present invention;

Fig. 3 is a longitudinal sectional view of a "preform" of the tapered tube produced by winding impregnated sheet material upon a mandrel;

Fig. 4 is an enlarged partial sectional view showing the mold and mandrel with the tube and bushing thereon after completion of a molding operation;

Fig. 5 is a fragmentary sectional view showing a modified form of mandrel wherein the spindle portion for receiving the bushing is threaded to form a threaded surface on the interior of the bushing portion of the completed article;

Fig. 6 is a view generally similar to Fig. 4 showing the mold and mandrel with the threaded spindle portion and the tapered tube with the bushing therein after completion of a molding operation; and Fig. 7 is a fragmentary sectional view showing a modification of the invention.

With reference more particularly to the drawing, the "preform" of the longitudinally tapered tube or horn 1 is formed as set forth in the aforesaid patent by winding upon a mandrel sheet material such as paper, fabric, asbestos, glass cloth and the like which is impregnated with a moldable material such as moldable resinous material, for example, a phenol-formaldehyde resin.

A "preform" of the bushing 2 also is formed in a generally similar manner. The non-metallic bushing preferably is of laminated construction and formed by winding sheet material such as paper, fabric, asbestos, glass cloth and the like which is impregnated with a moldable material upon a cylindrical mandrel having a diameter the same as the desired internal bore of the bushing portion of the completed article. It is not necessary that the bushing be made of precisely the same material as the tapered tube portion of the article and any of the sheet materials set forth may be used alone or in combination as desired.

Furthermore, while a laminated bushing construction may be preferred, such construction is not necessary and for certain uses good results have been obtained by the use of bushings of a homogeneous or non-laminated construction, for example, made of macerated fabric base molding materials and molding compounds containing graphite or abrasive materials. However, where strength is an important factor in the finished article, the laminated bushing construction should be utilized because although the homogeneous form of bushing is firmly bonded to and constitutes an integral part of the tapered tube portion of the finished article, the homogeneous bushing is not as strong structurally as a bushing of the described laminated construction.

In either event and regardless of the type of the bushing construction utilized, it is an essential and important feature of the present invention that the moldable binder material incorporated in the bushing "preform" be of a type similar to and comparable with the molding composition present in the tapered tube "preform" in order to provide compatibility between the bushing and tube portions of the article and insure intimate bonding of these parts together. In other words, the moldable material with which the bushing is impregnated must be one which can be cured at the same rate as the moldable material in the tapered tube "preform" under similar conditions of temperature and pressure.

In accordance with the present invention, after a "preform" of a bushing of either laminated or homogeneous construction has been formed upon a suitable mandrel as previously set forth, the bushing "preform" is partially precured under heat to a degree of cure where the temperature and time required thereafter to complete curing of the bushing is substantially the same as the amount of heat and time required to cure the tube "preform." The reason for this is that in articles of the type involved, the bushing portion and, of course, the bushing "preform" usually has a thickness as much as several times greater than the wall thickness of the tube "preform," and hence the thicker bushing "preform" will require a proportionately greater curing time than is required to cure the thinner wall thickness of the tapered tube. Consequently, if the bushing "preform" is not partially pre-cured as described before it is assembled in the tube "preform," there would result a substantial over-curing of the tube portion to an extent making the tube brittle and with a tendency to warp. On the other hand, in instances where the thickness of the bushing and tube portions of the article are substantially the same, it may be possible to dispense with the partial pre-curing of the bushing "preform."

In this connection we have discovered that there is a desirable relationship between the percentage degree of cure and a given unit wall thickness of a bushing "preform." For example, we have determined for each approximately one-eighth inch of bushing wall thickness, an increase in the percentage of degree of cure inwardly from the surface of the bushing, in an amount approximately 8% to 12%, and preferably in the vicinity of 10%, gives very good results.

The term degree of cure as used herein refers to the percentage of exuded resin determined by flow test of a bushing section 3" in diameter which is pressed between hot pressing plates at a temperature of 320° C. under a pressure of 1,000 p. s. i. for four minutes. The piece is then removed from the hot press, the exuded resin is scraped off of the sides and the piece weighed. The exuded resin or flash is reported as percent of flow and measures the degree of cure. The most ideal condition would be to have the degree of flow of the "preform" decrease gradually toward the center, but this condition is almost impossible to attain on a commercial basis.

When the bushing "preform" has been fabricated and partially cured to the desired degree as previously described, the tube "preform" 1 and bushing "preform" 2 are assembled upon the core mandrel 10 of a molding apparatus in the relation shown, for example, in Fig. 1 of the drawing, the said mandrel 10 having a reduced spindle portion 10a to receive and support the bushing "preform." The molding apparatus may embody the general construction shown and described in the aforeseen patent. In the construction illustrated in Figs. 1 and 4 of the drawing, the molding apparatus comprises a mold 11 having a tapered mold chamber 12. The mold is equipped with a plug 13 fitting in the smaller end of the chamber and having at its inner end a beveled shoulder portion 14 for providing an internal bevel at the small end of the article. The core mandrel 10 is mounted on the ram 15 of a pressure cylinder 16. Either or both the mold 11 and mandrel are heated to the desired temperature by suitable means (not shown) and pressure is applied through the cylinder 16 to move the core 10 and the "preforms" thereon longitudinally into the mold chamber 12.

The temperature to which the apparatus is heated, and the pressure exerted by the ram and mandrel during the molding operation will vary according to the nature of the moldable material embodied in the bushing and tube "preforms," and in any event these physical conditions are determined to insure proper molding and curing of the tube "preform" with completion of the final curing stage of the bushing "preform" and simultaneously uniting and bonding these two portions integrally together to produce a unitary article.

When the molding operation is completed, the ram 15 and core mandrel 10 are withdrawn from the mold 11 and the finished molded article is manually removed from the mandrel. In instances where it is desired to provide threads in the internal bore of the bushing portion of the article, this may be accomplished by using a core mandrel having a threaded spindle portion 10b, for example, as shown in Figs. 5 and 6 of the drawing, or the internal bore of the bushing portion may be made smooth as in Fig. 4 and subsequently threaded by conventional machining or tapping practices.

As previously stated herein, the bushing "preform" 2 may have any desired wall thickness so long as such "preform" is pre-cured to an extent that the difference in degree of cure varies approximately 10% for each one-eighth inch of wall thickness. Alternatively, however, and in lieu of a single bushing "preform" having a substantial thickness, there may be employed two or more bushing "preforms" of lesser wall thickness, for example, approximately one-eighth inch, assembled as shown in Fig. 7 of the drawing.

With reference to Fig. 7, the assembly comprises two bushing "preforms" 2a and 2b of equal wall thickness, for example, one-eighth inch, and a tube "preform" 1 which are placed in coaxial relationship on the spindle portion 10a of the core mandrel 10 prior to the molding operation. Before being placed on the core mandrel the two bushing "preforms" 2a and 2b are partially pre-cured as previously described to different degrees of cure depending on their location and relative thickness, the degree of cure being measured by the flow of exuded resin as previously described. Thus for the example given, the bushing "preform" 2b is pre-cured to a degree of cure approximately 10% and the bushing "preform" 2a is pre-cured to a degree of cure of approximately 20% so that in the molding operation a uniform degree of cure is provided throughout the entire article resulting in a more uniform and stronger structure. If a hot mandrel is used, the degree of cure of both the tube "preform" 1 and the inner bushing "preform" 2b should be the same since they will be subjected to approximately the same rate of heating while section 2a will require a longer time before it reaches the maximum temperature attained by the tube and bushing "preforms" 1 and 2b, respectively. In this case the bushing "preform" 2a would be pre-cured to a degree of cure approximately 10% more than that of the tube "preform" 1 and the bushing "preform" 2b in order to provide a uniform degree of cure throughout the finished article.

From the drawing and the foregoing description, it will be apparent that the present invention provides a tapered tube or horn construction having integrally bonded thereto one or more molded bushings of material similar to that embodied in the tube portion of the article. Another feature of the present invention is that the wall thickness of the tapered tube portion of the article can be increased as shown at 17 in Fig. 6 and as indicated by broken lines in Fig. 3 so that the wall thickness of the tube is increased at and adjacent the bushing portion thereof and provides a construction of maximum strength.

While certain embodiments of the present invention have been illustrated and described herein, it is not intended to limit the invention to such disclosures, and changes and modifications may be incorporated and embodied therein within the scope of the following claims.

We claim:

1. An article of manufacture comprising a seamless molded tapered tube portion consisting of radially compressed fibrous sheet material impregnated with and bonded by a converted moldable resin, and a tubular molded bushing portion integrally bonded together and to the interior wall of the tube portion adjacent the small end thereof, said bushing portion consisting of radially compressed fibrous material containing and bonded by a converted moldable resin, the converted moldable resin in said tube and bushing portions being compatible and having similar conversion characteristics of temperature and pressure to insure a strong common bond between said tube and bushing portions.

2. An article as claimed in claim 1 wherein the tubular molded bushing portion is constituted of a plurality of concentrically arranged bushing "preforms."

3. An article of manufacture comprising a seamless molded tapered tube portion consisting of radially compressed annular plies of fibrous sheet material impregnated with and bonded by a converted moldable resin, and a tubular molded bushing portion integrally bonded together and to the interior wall of the tube portion adjacent the small end thereof, said bushing portion consisting of radially compressed annular plies of fibrous sheet material impregnated with and bonded by a converted moldable resin, the converted moldable resin in said tube and bushing portions being compatible and having similar conversion characteristics of temperature and pressure to insure a strong common bond between said tube and bushing portions.

4. In the method of making molded tapered horns, the steps which comprise forming a tapered tube "preform" consisting of non-metallic fibrous sheet material impregnated with a heat convertible moldable resin, forming a tubular bushing "preform" of greater wall thickness than said tube "preform" consisting of non-metallic fibrous material containing a heat convertible moldable resin compatible with the resin in said tube "preform," partially pre-curing the bushing "preform" to a predetermined percentage value per unit of bushing wall thickness so that the amount of curing required to complete cure of the bushing "preform" is substantially the same as required to cure the tube "preform," supporting the tube and bushing "preforms" upon a mandrel with the bushing "preform" disposed internally of the tube "preform," and subjecting the "preforms" while on said mandrel to heat and radial compression in a mold to cure the tube and bushing and simultaneously integrally bond the same together.

5. The method claimed in claim 4 wherein the bushing "preform" is pre-cured to a degree of cure of about 8% to 12% for each approximately one-eighth inch of bushing wall thickness.

6. The method claimed in claim 4 wherein the bushing "preform" is pre-cured to a degree of cure of about 10% for each approximately one-eighth inch of bushing wall thickness.

References Cited in the file of this patent

UNITED STATES PATENTS

| Number | Name | Date |
|---|---|---|
| 1,284,296 | Frederick | Nov. 12, 1918 |
| 1,778,164 | Platter et al. | Oct. 14, 1930 |
| 1,896,135 | Dunlap | Feb. 7, 1933 |
| 2,013,747 | Dunlap | Sept. 10, 1935 |
| 2,025,830 | Rosmait | Dec. 31, 1935 |
| 2,193,513 | Hempel et al. | Mar. 12, 1940 |
| 2,205,891 | Sprenger | June 25, 1940 |
| 2,319,267 | Sawyer | May 18, 1943 |
| 2,400,031 | Stewart | May 7, 1946 |